(12) United States Patent
Shibaoka

(10) Patent No.: US 12,401,067 B2
(45) Date of Patent: Aug. 26, 2025

(54) ALKALINE SECONDARY BATTERY

(71) Applicant: FDK CORPORATION, Tokyo (JP)

(72) Inventor: Hiroyuki Shibaoka, Tokyo (JP)

(73) Assignee: FDK CORPORATION, Tokyo (JP)

( * ) Notice: Subject to any disclaimer, the term of this patent is extended or adjusted under 35 U.S.C. 154(b) by 51 days.

(21) Appl. No.: 17/310,729

(22) PCT Filed: Feb. 19, 2020

(86) PCT No.: PCT/JP2020/006462
§ 371 (c)(1),
(2) Date: Aug. 19, 2021

(87) PCT Pub. No.: WO2020/171112
PCT Pub. Date: Aug. 27, 2020

(65) Prior Publication Data
US 2022/0123374 A1    Apr. 21, 2022

(30) Foreign Application Priority Data

Feb. 22, 2019    (JP) ................................. 2019-030802

(51) Int. Cl.
*H01M 10/28*    (2006.01)
*H01M 4/24*    (2006.01)
(Continued)

(52) U.S. Cl.
CPC ........... *H01M 10/28* (2013.01); *H01M 4/242* (2013.01); *H01M 50/107* (2021.01);
(Continued)

(58) Field of Classification Search
CPC .... H01M 10/28; H01M 4/242; H01M 50/107; H01M 50/147; H01M 50/183;
(Continued)

(56) References Cited

U.S. PATENT DOCUMENTS

2005/0271942 A1    12/2005    Izumi et al.

FOREIGN PATENT DOCUMENTS

| JP | S60100382 A | 6/1985 |
|---|---|---|
| JP | S61118963 A | 6/1986 |

(Continued)

OTHER PUBLICATIONS

International Search Report and Written Opinion dated Apr. 28, 2020, for corresponding PCT Application No. PCT/JP2020/006462.
(Continued)

*Primary Examiner* — Helen Oi K Conley
(74) *Attorney, Agent, or Firm* — Kinney & Lange, P.A.

(57) ABSTRACT

A nickel hydrogen secondary battery includes an electrode group including a positive electrode and a negative electrode that face each other via a separator, an outer package can that has an opening at an upper end thereof, and accommodates the electrode group therein together with an electrolyte, a sealing body including a cover plate fitted in the opening of the outer package can, and a positive electrode cap which is electrically connected to an outer surface of the cover plate, a positive electrode lead, one end portion of which is electrically connected to an inner surface of the cover plate and the other end portion of which is electrically connected to the positive electrode, and an oxygen block layer that covers at least a range where the one end portion of the positive electrode lead and the inner surface of the cover plate overlap each other, and suppresses permeation of oxygen therethrough, and a thickness of a thinnest portion of the oxygen block layer is 3 μm or more.

7 Claims, 3 Drawing Sheets

(51) Int. Cl.
  *H01M 50/107*  (2021.01)
  *H01M 50/147*  (2021.01)
  *H01M 50/183*  (2021.01)
  *H01M 50/533*  (2021.01)
  *H01M 50/534*  (2021.01)

(52) U.S. Cl.
  CPC ....... *H01M 50/147* (2021.01); *H01M 50/183* (2021.01); *H01M 50/533* (2021.01); *H01M 50/534* (2021.01); *H01M 2300/0014* (2013.01)

(58) Field of Classification Search
  CPC ............. H01M 50/533; H01M 50/534; H01M 2300/0014; Y02P 70/50; Y02E 60/10
  See application file for complete search history.

(56) References Cited

FOREIGN PATENT DOCUMENTS

| | | |
|---|---|---|
| JP | 2004281226 A | 10/2004 |
| JP | 2012054098 A | 3/2012 |
| JP | 2014035991 A | 2/2014 |
| WO | 2018116567 A1 | 6/2018 |
| WO | 2018116574 A1 | 6/2018 |

OTHER PUBLICATIONS

Extended European Search Report for European Patent Application No. 20758448.3, Dated Jun. 28, 2024, 9 Pages.

ALKALINE SECONDARY BATTERY

CROSS-REFERENCE TO RELATED APPLICATION(S)

This application is a Section 371 National Stage Application of International Application No. PCT/JP2020/006462, filed on Feb. 19, 2020, entitled "ALKALINE SECONDARY BATTERY", which claims priority to Japanese Patent Application No. 2019-030802, filed on Feb. 22, 2019, both of which are incorporated herein by reference in their entireties.

TECHNICAL FIELD

The present disclosure relates to an alkaline secondary battery.

BACKGROUND

A nickel hydrogen secondary battery with a negative electrode containing a hydrogen storage alloy is known as one kind of alkaline secondary battery. Since this nickel hydrogen secondary battery is used as a power source for various kinds of devices because it has excellent output characteristics. A hermetically sealed type nickel hydrogen secondary battery is generally used as a nickel hydrogen secondary battery as described above. This hermetically sealed type nickel hydrogen secondary battery includes an outer package can having an opening at one end thereof and also serving as a negative electrode terminal at the other end thereof, an electrode group accommodated in the outer package can together with an alkaline electrolyte, and a sealing body that airtightly blocks the opening of the outer package can described above.

The above-mentioned sealing body includes a cover plate which is to be fitted in the opening of the outer package can and has a vent hole formed in the center thereof, a valve body arranged so as to block the vent hole, and a positive electrode cap which accommodates this valve body therein and is welded to the cover plate. This positive electrode cap has a tubular body portion, a top wall that blocks one end of the body portion, and a flange provided on the peripheral edge of the opening on the opposite side of the top wall, and also serves as a positive electrode terminal. Further, a gas vent hole is provided on a side surface of the body portion.

The above-described valve body is formed of an elastic material, for example, a rubber-based material, is arranged in a compressed state between the top wall of the positive electrode cap and the cover plate, and blocks an open end of the vent hole up to a predetermined pressure to keep the sealability of the battery. When gas is abnormally generated in the battery and the pressure of the gas exceeds a certain value, this valve body opens the open end of the vent hole to release the gas, thereby preventing the battery from bursting. In other words, this valve body functions as a safety valve.

The above-mentioned electrode group includes a positive electrode and a negative electrode which are overlapped with each other via a separator. The outermost part of the electrode group is formed of a negative electrode. The negative electrode located on the outermost part of this electrode group comes into contact with the inner wall of the outer package can, so that the negative electrode and the negative electrode terminal are electrically connected to each other. Further, a positive electrode lead which is formed of, for example, a metal strip is arranged between the positive electrode of the electrode group and the cover plate, one end portion of the positive electrode lead is welded to the cover plate, and the other end portion of the positive electrode lead is welded to a part of the positive electrode. As a result, the positive electrode and the positive electrode terminal are electrically connected to each other via the positive electrode lead and the cover plate.

In the nickel hydrogen secondary battery as described above, oxygen gas is generated from the positive electrode when overcharging occurs. However, this oxygen gas reacts with the hydrogen storage alloy of the negative electrode to form water. In other words, since the oxygen gas can be absorbed by the hydrogen storage alloy of the negative electrode, the increase in the internal pressure of the battery can be suppressed, so that the nickel hydrogen secondary battery can be hermetically sealed.

Depending on the environment in which the nickel hydrogen secondary battery is used, the ambient temperature may rise and oxygen gas may be easily generated from the positive electrode. If the amount of the oxygen gas generated from the positive electrode exceeds the absorption amount of the oxygen gas at the negative electrode, the outer package can of the nickel hydrogen secondary battery may burst. In order to avoid such a situation, the nickel hydrogen secondary battery is provided with the above-mentioned safety valve.

Here, when the safety valve is activated, a part of the alkaline electrolyte is also released to the outside of the outer package can together with the gas, which may cause a risk that the life of the battery is shortened and also the alkaline electrolyte adheres to components around the battery in the device in which the battery is accommodated, resulting in corrosion of these components. Therefore, various studies have been conducted to promote the absorption of oxygen gas at the negative electrode in order to avoid, to the utmost, the situation where the safety valve is activated. For example, Patent Document 1 discloses a method of adding a precious metal catalyst such as platinum to a negative electrode to promote reduction of oxygen gas, and Patent Document 2 discloses a technique of providing a water-repellent layer on a hydrogen storage alloy negative electrode to promote absorption of oxygen gas on the negative electrode.

PRIOR ART DOCUMENT

Patent Document

Patent Document 1: Japanese Patent Laid-Open No. 60-100382
Patent Document 2: Japanese Patent Laid-Open No. 61-118963

SUMMARY

In recent years, nickel hydrogen secondary batteries have been used for more and more applications, and are used, for example, as backup power sources for the purpose of measures against power outages in an emergency.

Since a backup power source is equipped in preparation for sudden and short interruption of power supply such as a power outage, a continuous charging method in which charging is constantly performed is adopted. In the case of continuous charging, even when charging reaches full charging, the charging still continues, so that the battery is apt to be overcharged. When the battery is overcharged, oxygen gas is generated from the positive electrode as described above. Therefore, in applications adopting the continuous charging, oxygen gas is generated from the positive electrode for most of the time.

Further, when the nickel hydrogen secondary battery is charged, reaction heat and Joule heat are generated due to battery reaction and the temperature rises, so that the hydrogen storage alloy inside the battery is exposed to a high temperature. When the hydrogen storage alloy is exposed to a high temperature, deterioration thereof progresses. In the case of the continuous charging, the period of exposure to high temperature is long, so that the deterioration of the hydrogen storage alloy progresses more greatly than that in a normal usage mode.

In a state where the hydrogen storage alloy is not deteriorated, even when oxygen gas is generated, the oxygen gas can be sufficiently absorbed at the negative electrode. However, as the deterioration of the hydrogen storage alloy progresses, the ability of the hydrogen storage alloy itself to absorb oxygen gas decreases. Therefore, even when measures for promoting absorption of oxygen gas are taken as in the case of Patent Document 1 and Patent Document 2, it is difficult for the absorption of oxygen gas to proceed. Therefore, as the continuous charging period is longer, the amount of oxygen gas in the battery increases, so that constituent members in the battery are exposed to oxygen gas more and more.

Most of metal-based components such as the cover plate and the positive electrode lead among the constituent members in the battery are formed of nickel-plated iron-based materials. According to a normal charging method, the degree of exposure to oxygen gas is small, so that the cover plate and the positive electrode lead can sufficiently withstand oxidation. However, in the case of the continuous charging, as described above, the degree of exposure to oxygen gas increases, so that the cover plate and the positive electrode lead are oxidized, resulting in generation of rust. In particular, a welded portion between the cover plate and the positive electrode lead and its surroundings may have a nickel-plated layer which is thinned due to an influence of welding, and thus is prone to rust. When the welded portion between the cover plate and the positive electrode lead is rusted as described above, the internal resistance value of the battery increases, which causes a risk that it is impossible to discharge the battery.

Further, when the above-mentioned oxidation progresses, there is also a risk that a hole caused by corrosion occurs in the cover plate and the alkaline electrolyte leaks from the hole.

The present disclosure has been made based on the above circumstances, and an object of the present disclosure is to provide an alkaline secondary battery which can suppress generation of rust on metal components inside a battery and suppress leakage of an alkaline electrolyte even when continuous charging is performed.

In order to achieve the above object, according to the present disclosure, provided is an alkaline secondary battery comprising: an electrode group including a positive electrode and a negative electrode that face each other via a separator; an outer package can that has an opening at an upper end thereof and accommodates the electrode group therein together with an electrolyte; a sealing body including a cover plate fitted in the opening of the outer package can, and a positive electrode terminal which is electrically connected to an outer surface of the cover plate located outside the outer package can; a positive electrode lead, one end portion of which is electrically connected to an inner surface of the cover plate located inside the outer package can, and the other end portion of which is electrically connected to the positive electrode; and a coating layer that covers at least a range where the one end portion of the positive electrode lead and the inner surface of the cover plate overlap each other, and suppresses permeation of oxygen therethrough, wherein a thickness of a thinnest portion of the coating layer is 3 μm or more.

Further, it is preferable that the coating layer is configured to cover a range of an entire surface of the positive electrode lead, the range excluding a surface out of the entire surface of the positive electrode lead at which the positive electrode lead is in contact with other members.

Further, it is preferable that the coating layer is configured to cover a range of the inner surface of the cover plate, the range excluding a surface out of the inner surface of the cover plate at which the cover plate is in contact with other members, and a range of the entire surface of the positive electrode lead, the range excluding a surface out of the entire surface of the positive electrode lead at which the positive electrode lead is in contact with other members.

Further, it is preferable that the coating layer is configured to contain blown asphalt.

The alkaline secondary battery according to the present disclosure comprises an electrode group including a positive electrode and a negative electrode that face each other via a separator, an outer package can that has an opening at an upper end thereof and accommodates the electrode group therein together with an electrolyte, a sealing body including a cover plate fitted in the opening of the outer package can, and a positive electrode terminal which is electrically connected to an outer surface of the cover plate located outside the outer package can, a positive electrode lead, one end portion of which is electrically connected to an inner surface of the cover plate located inside the outer package can, and the other end portion of which is electrically connected to the positive electrode, and a coating layer that covers at least a range where the one end portion of the positive electrode lead and the inner surface of the cover plate overlap each other, and suppresses permeation of oxygen therethrough, and a thickness of a thinnest portion of the coating layer is 3 μm or more. As a result, it is possible to suppress oxidation of metal components such as the cover plate and the positive electrode lead even when oxygen gas is filled in the outer package can because the battery falls into an overcharged state due to continuous charging. Therefore, according to the present disclosure, it is possible to provide an alkaline secondary battery that is capable of suppressing generation of rust on metal components inside the battery and suppressing leakage of the alkaline electrolyte even when continuous charging is performed.

DETAILED DESCRIPTION

An alkaline secondary battery to which the present disclosure is applied will be described with reference to the drawings, for example, by exemplifying a case where the present disclosure is applied to a cylindrical nickel hydrogen secondary battery (hereinafter referred to as a battery) 2.

Figure 1:
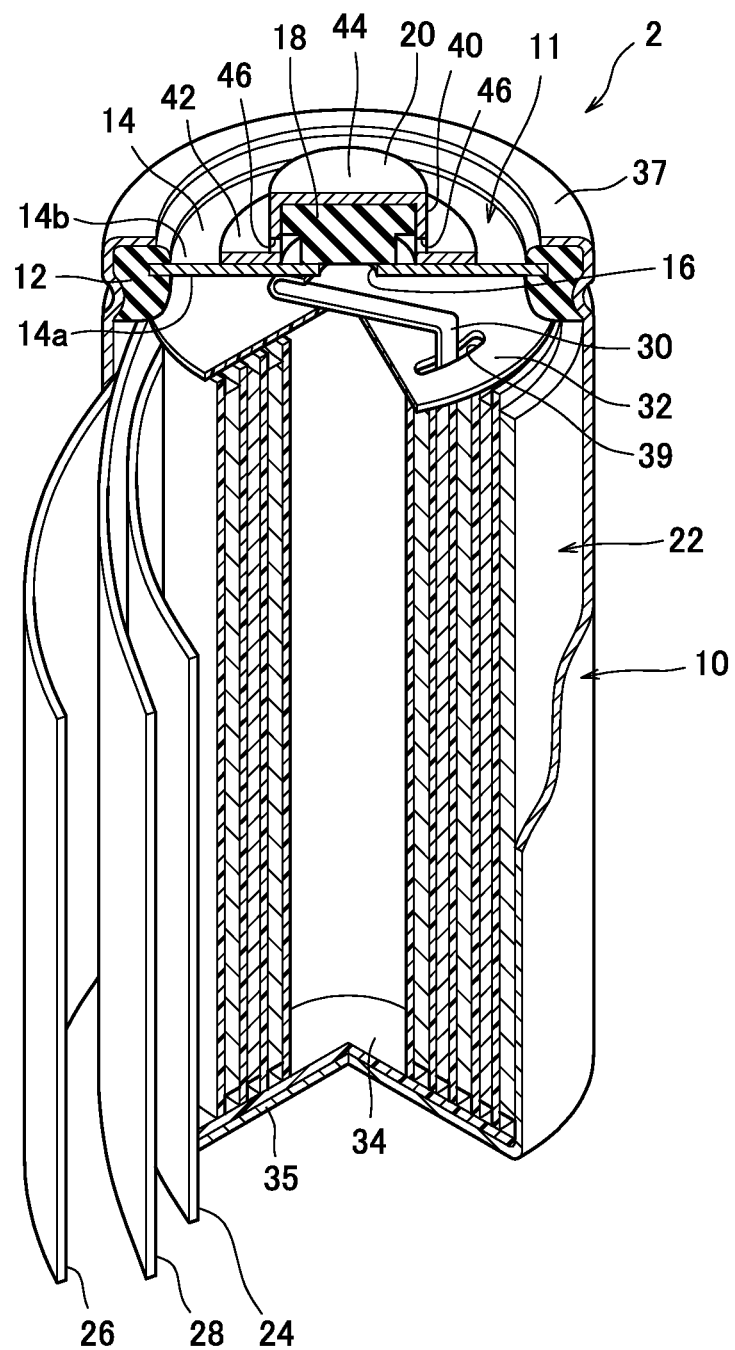
FIG. 1 is a perspective view showing a cylindrical nickel hydrogen secondary battery according to an embodiment of the present disclosure while partially breaking the cylindrical nickel hydrogen secondary battery.

As shown in FIG. 1, the battery 2 includes an outer package can 10 having a bottomed cylindrical shape with an open upper end. The outer package can 10 is formed by processing a plate material made of nickel-plated steel. The outer package can 10 has electric conductivity, and a bottom wall 35 of the outer package can 10 functions as a negative electrode terminal. An electrode group 22 is accommodated in the outer package can 10.

The electrode group 22 is formed by a belt-shaped positive electrode 24, a belt-shaped negative electrode 26, and a belt-shaped separator 28. Specifically, the electrode group 22 is formed by spirally winding the positive electrode 24 and the negative electrode 26 which are overlapped with each other with the separator 28 being interposed therebetween. The outermost circumference of the electrode group 22 is formed by a part of the negative electrode 26 (outermost peripheral portion), and is in contact with the inner peripheral wall of the outer package can 10. In other words, the negative electrode 26 and the outer package can 10 are electrically connected to each other.

Further, a predetermined amount of alkaline electrolyte (not shown) is injected into the outer package can 10. This alkaline electrolyte promotes a charge/discharge reaction between the positive electrode 24 and the negative electrode 26. As this alkaline electrolyte are used those which have been used for general nickel hydrogen secondary batteries. For example, it is preferable to use an aqueous solution of sodium hydroxide.

As the material of the separator 28 are used those which have been used for general nickel hydrogen secondary batteries. For example, it is preferable to use a non-woven fabric made of polyolefin fiber such as polyethylene or polypropylene.

The positive electrode 24 includes a conductive positive electrode base material having a porous structure which has a large number of pores, and a positive electrode mixture which is held in the pores and on the surface of the positive electrode base material.

For example, nickel foam can be used as such a positive electrode base material.

The positive electrode mixture contains positive electrode active material particles, a conductive material, a positive electrode additive, and a binder. This binder serves to bind the positive electrode active material particles, the conductive material, and the positive electrode additive, and at the same time, serves to bind the positive electrode mixture to the positive electrode base material. Here, for example, carboxymethyl cellulose or the like can be used as the binder.

The positive electrode active material particles are nickel hydroxide particles or higher-order nickel hydroxide particles.

As the conductive material may be used, for example, one or more kinds of elements selected from cobalt compounds such as cobalt oxide (CoO) and cobalt hydroxide ($Co(OH)_2$) and cobalt (Co).

As the positive electrode additive is added a material which is appropriately selected as necessary in order to improve the characteristics of the positive electrode. Main examples of the positive electrode additive include yttrium oxide and zinc oxide.

The positive electrode 24 can be manufactured as follows, for example.

First, a positive electrode mixture slurry containing positive electrode active material powder which is an aggregate of positive electrode active material particles, a conductive material, a positive electrode additive, water, and a binder is prepared. The obtained positive electrode mixture slurry is filled in, for example, nickel foam, and dried. After drying, the nickel foam filled with nickel hydroxide particles and the like is rolled and then cut. As a result, the positive electrode 24 holding the positive electrode mixture is manufactured.

Next, the negative electrode 26 will be described.

The negative electrode 26 has a belt-shaped conductive negative electrode core, and a negative electrode mixture is held in the negative electrode core.

The negative electrode core is a sheet-shaped metal material in which through-holes are distributed, and for example, a punching metal sheet can be used. The negative electrode mixture is not only filled in the through-holes of the negative electrode core, but also held on both sides of the negative electrode core in the form of a layer.

The negative electrode mixture contains particles of a hydrogen storage alloy, a negative electrode additive, a conductive material and a binder. Here, the hydrogen storage alloy is an alloy capable of storing and releasing hydrogen which is a negative electrode active material. The type of the hydrogen storage alloy is not particularly limited, but a rare-earth-Mg—Ni-based hydrogen storage alloy containing a rare earth element, Mg and Ni is used as a suitable one. The above-mentioned binder has a function of binding the particles of the hydrogen storage alloy, the negative electrode additive, and the conductive material to one another, and at the same time, binds the negative electrode mixture to the negative electrode core. Here, a hydrophilic or hydrophobic polymer can be used as the binder, and carbon black, graphite, nickel powder or the like can be used as the conductive material.

As the negative electrode additive is added a material which is appropriately selected as necessary in order to improve the characteristics of the negative electrode.

The negative electrode 26 can be manufactured as follows, for example.

First, hydrogen storage alloy powder, a conductive material, a binder, and water are prepared, and these materials are kneaded to prepare a negative electrode mixture paste. Note that a negative electrode additive may be further added as needed. The obtained negative electrode mixture paste is coated on the negative electrode core and dried. After drying, the negative electrode core to which the hydrogen storage alloy particles and the like adhere is rolled to increase the packing density of the hydrogen storage alloy, and then cut into a predetermined shape, thereby manufacturing the negative electrode 26.

The positive electrode 24 and the negative electrode 26 manufactured in the manner as described above are spirally wound with the separator 28 interposed therebetween, thereby forming the electrode group 22.

The sealing body 11 is fixed to the opening of the outer package can 10 in which the electrode group 22 and the alkaline electrolyte as described above are accommodated. The sealing body 11 includes a cover plate 14, a valve body 18, and a positive electrode cap 20.

The cover plate 14 is a disk-shaped member having electric conductivity which is manufactured by processing a plate material made of nickel-plated steel, and has an inner surface 14a located on an inner side of the battery 2 and an outer surface 14b located on an outer side of the battery 2 which is an opposite side to the inner surface 14a. Further, a central through-hole 16 as a vent hole which penetrates from the inner surface 14a to the outer surface 14b is provided in the center of the cover plate 14. The central through-hole 16 is usually blocked by the valve body 18 described later. The cover plate 14 and a ring-shaped insulating packing 12 surrounding the cover plate 14 are arranged in the opening of the outer package can 10, and the cover plate 14 and the insulating packing 12 are fixed to an opening edge 37 of the outer package can 10 by caulking the opening edge 37 of the outer package can 10.

The positive electrode cap 20 manufactured by processing a plate material made of nickel-plated steel is electrically connected to the outer surface 14b of the cover plate 14. The positive electrode cap 20 is a component that accommodates the valve body 18 therein and serves as a positive electrode terminal in the battery 2.

Figure 2:
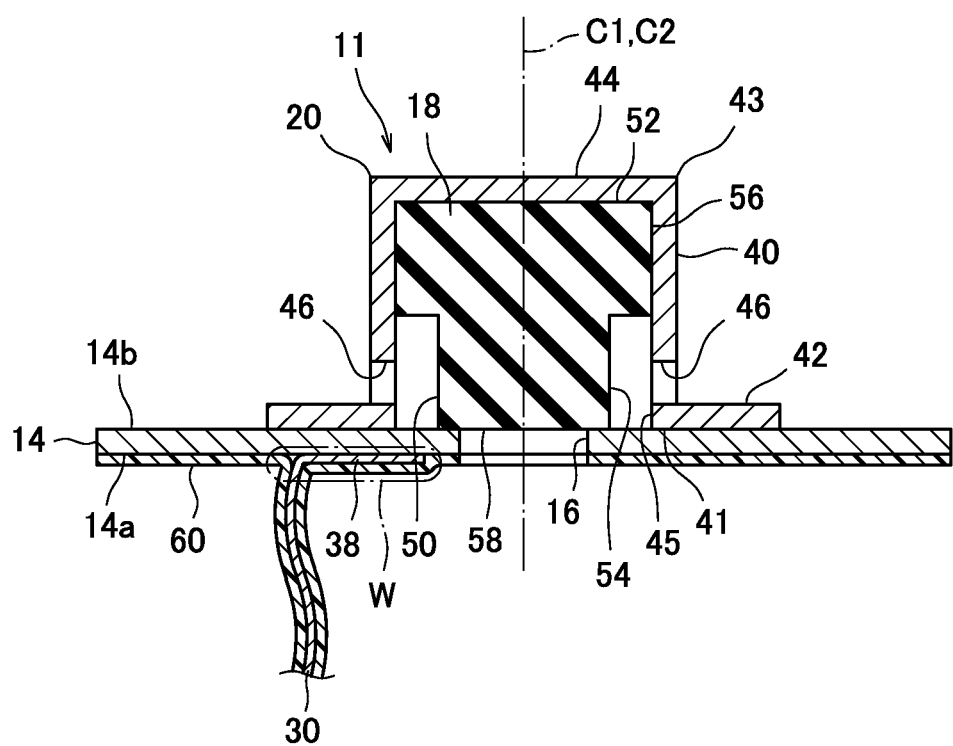
FIG. 2 is an enlarged cross-sectional view showing a sealing body portion of the nickel hydrogen secondary battery according to the embodiment of the present disclosure.

As shown in FIG. 2, the positive electrode cap 20 includes a cylindrical body portion 40, an annular flange 42 provided at the peripheral edge of an opening 45 of a base end 41 of the body portion 40, and a top wall 44 which is provided so as to block a tip portion 43 on the opposite side to the base end 41. Further, as is apparent from FIG. 2, a gas vent hole 46 that opens sideward is formed at a lower portion of the body portion 40. The positive electrode cap 20 is arranged so as to cover the valve body 18, and the portion of the flange 42 is welded to the outer surface 14b of the cover plate 14. Here, the inner diameter of the body portion 40 of the positive electrode cap 20 is larger than the diameter of the central through-hole 16 of the cover plate 14.

As the valve body 18 is used one which is used in a general nickel hydrogen secondary battery. Preferably, for example, a columnar or stepped columnar valve body made of a rubber-based material is used.

The valve body 18 made of a rubber-based material is elastically deformable, and is accommodated in the positive electrode cap 20 while compressed to some extent. As a result, a head portion 52 of the valve body 18 comes into contact with the inner surface of the top wall 44 of the positive electrode cap 20, and is pressed toward the cover plate 14 as a whole. Further, a base end surface 58 of a main body portion 54 of the valve body 18 covers the central through-hole 16 to airtightly block the central through-hole 16. In other words, the valve body 18 blocks the central through-hole 16 under a predetermined pressure.

When the battery 2 is overcharged or the like, gas is abnormally generated in the outer package can 10, the pressure of the gas in the battery 2 rises, and the pressure of the gas exceeds a predetermined pressure, the valve body 18 is compressed and deformed, so that the central through-hole 16 is opened. As a result, the gas is released from the inside of the outer package can 10 to the outside through the central through-hole 16 and the gas vent hole 46 of the positive electrode cap 20. When the pressure of the gas in the battery 2 drops due to the release of the gas, the valve body 18 returns to its original shape and hermetically seals the battery 2 again.

Next, as is apparent from FIG. 1, a positive electrode lead 30 is arranged between the electrode group 22 and the cover plate 14 in the outer package can 10. The positive electrode lead 30 is a belt-shaped body made of nickel-plated steel, one end portion 38 of the positive electrode lead 30 being welded to the inner surface 14a of the cover plate 14 while the other end portion of the positive electrode lead 30 is welded to a part of the positive electrode 24. As described above, the positive electrode lead 30 welded to the positive electrode 24 is also welded to the cover plate 14 connected to the positive electrode terminal (positive electrode cap 20), so that the positive electrode 24 and the positive electrode terminal (positive electrode cap 20) are electrically connected to each other via the cover plate 14 and the positive electrode lead 30.

Note that a circular upper insulating member 32 is arranged between the cover plate 14 and the electrode group 22, and the positive electrode lead 30 extends through a slit 39 provided in the upper insulating member 32. Further, a circular lower insulating member 34 is also arranged between the electrode group 22 and a bottom portion of the outer package can 10.

In the present disclosure, an oxygen block layer 60 as a coating layer for suppressing permeation of oxygen is provided at predetermined positions on the inner surface 14a of the cover plate 14 and the surface of the positive electrode lead 30. The oxygen block layer 60 is formed of a material capable of blocking permeation of oxygen. Examples of such a material may include sealant to be used for maintaining airtightness as a suitable material. Further, since this sealant may come into contact with the alkaline electrolyte, it is more preferable that the sealant does not deteriorate in an alkaline atmosphere. Examples of such sealant include, for example, blown asphalt. The blown asphalt is used in the form of paste by dissolving the blown asphalt in an organic solvent (for example, toluene). Further, a similar effect can be obtained by using a rubber-based material instead of blown asphalt. Examples of preferable rubber-based materials include rubber-based materials having alkali resistance, and specifically include ethylene propylene diene rubber. Note that in the case of rubber-based materials, those materials containing an additive such as chlorine or sulfur may promote generation of rust on metal materials, and therefore those materials containing chlorine or sulfur as an additive should be avoided. Note that a material for forming the oxygen block layer 60 is not limited to the sealant as described above, and it is not particularly limited as long as it is an alkali-resistant material which can coat a metal portion.

For example, a method in which a pasted material obtained by dissolving blown asphalt described above in an organic solvent is coated onto predetermined ranges of metal members 36 such as the cover plate 14 and the positive electrode lead 30 by using a brush, a blade, a roller or the like and then dried to form the oxygen block layer 60 is preferably adopted as a method for forming the oxygen block layer 60.

A range where the oxygen block layer 60 is formed is preferably set to a range which can cover a portion to be easily oxidized by oxygen gas. The portions of the cover plate 14 and the positive electrode lead 30 which are easily oxidized are portions where the nickel-plated layer is denatured, thinned, or peeled off. Most of these portions are caused by an influence of the welding work. In other words, there is a high possibility that a welded portion W at which the cover plate 14 and the positive electrode lead 30 overlap each other is a portion where the nickel-plated layer is denatured, thinned, or peeled off. Therefore, the oxygen block layer 60 is formed at least in a range covering the welded portion W at which the positive electrode lead 30 is overlapped with and welded to the cover plate 14.

Preferably, the oxygen block layer 60 is formed on the entire positive electrode lead 30 including the welded portion W described above. Specifically, the oxygen block layer 60 as a coating layer is formed in a range of the entire surface of the positive electrode lead 30, the range excluding a surface out of the entire surface of the positive electrode lead 30 at which the positive electrode lead 30 is in contact with other members, for example, the cover plate 14 and the positive electrode 24.

More preferably, the oxygen block layer 60 is formed in a range covering the entire inner surface 14*a* of the cover plate 14 and the surface of the positive electrode lead 30. Specifically, the oxygen block layer 60 as a coating layer is formed in a range of the inner surface 14*a* of the cover plate 14, the range excluding a surface out of the inner surface 14*a* at which the cover plate 14 is in contact with another member, for example, the positive electrode lead 30, and also in a range of the entire surface of the positive electrode lead 30, the range excluding a surface out of the entire surface of the positive electrode lead 30 at which the positive electrode lead is in contact with other members, for example, the cover plate 14 and the positive electrode 24. As a result, those ranges which may be exposed to oxygen gas can be covered with the oxygen block layer 60.

Pinholes may be present in the nickel-plated layers of the cover plate 14 and the positive electrode lead 30, and oxidation may proceed from these pinholes as starting points to cause rust. Since it is impossible to specify the positions of such pinholes, it is a more preferable embodiment to cover the entire range that may be exposed to oxygen gas.

Here, the cover plate 14 is provided with the central through-hole 16, and it is preferable that the oxygen block layer 60 is also provided on the inner peripheral surface of the central through-hole 16. Provision of the oxygen block layer 60 on the inner peripheral surface of the central through-hole 16 makes it possible to suppress generation of rust starting from the inner peripheral surface of the central through-hole 16 as a starting point, and this is more preferable.

Further, when the thickness of the oxygen block layer 60 is less than 3 µm, it is impossible to sufficiently block permeation of oxygen, so that generation of rust cannot be suppressed. Preferably, the thickness of the oxygen block layer 60 is set to 9 µm or more. This is because the permeation of oxygen can be more reliably blocked and the generation of rust can be suppressed. The thickness of the oxygen block layer 60 is preferably larger because the larger the thickness is, the more oxygen permeation can be blocked. However, even when the thickness of the oxygen block layer 60 is further increased, the above effect will be saturated. Therefore, the thickness of the oxygen block layer 60 is preferably set to 9 µm or more and 80 µm or less, and more preferably set to 9 µm or more and 16 µm or less.

Here, it is ideal that the oxygen block layer 60 has a uniform thickness as a whole. However, the thickness may become non-uniform depending on the formation condition of the oxygen block layer 60 or the like. When the set thickness is small, for example, about 3 µm, the thickness is partially less than 3 µm, and an extremely thin portion may be formed. In such a case, rust may occur with such an extremely thin portion as a starting point.

Figure 3:
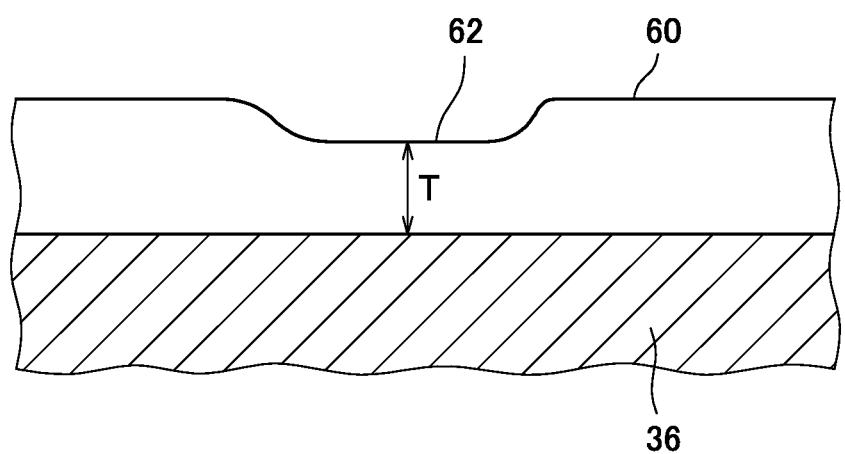
FIG. 3 is a cross-sectional view schematically showing the shape of an oxygen block layer according to the embodiment of the present disclosure.

Therefore, as shown in FIG. 3, with respect to the oxygen block layer 60 formed on the surface of the metal member 36, the thickness T of a thinnest portion 62 is set to 3 µm or more.

When an extremely thin portion, for example, a portion having a thickness of less than 3 µm is formed in the oxygen block layer 60, the appearance of the oxygen block layer 60 is in a so-called uneven state in which light and shade occur in color. In other words, when unevenness occurs, an extremely thin portion having a thickness of less than 3 µm is generated, which serves as a guideline indicating that the condition that the thickness T of the thinnest portion 62 is 3 µm or more is not satisfied.

As described above, according to the present disclosure, the oxygen block layer 60 exists at appropriate portions on the surfaces of the cover plate 14 and the positive electrode lead 30 in the sealing body 11. Therefore, even when the battery 2 falls into an overcharged state to generate oxygen gas during continuous charging, it is possible to effectively prevent the cover plate 14 and the positive electrode lead 30 from being oxidized and rusting. Therefore, it is possible to suppress an increase in the internal resistance value due to rust and leakage of the alkaline electrolyte, and it is possible to provide a higher quality battery.

EXAMPLES

Manufacture of Nickel Hydrogen Secondary Battery

Example 1

(1) Manufacture of Sealing Body

First, a valve body 18 made of ethylene propylene diene rubber generally used for nickel hydrogen secondary batteries was prepared. As shown in FIG. 2, the valve body 18 includes a columnar head portion 52 and a main body portion 54 having a diameter smaller than that of the head portion 52. The central axis C1 of the head portion 52 and the central axis C2 of the main body portion 54 coincide with each other, that is, the head portion 52 and the main body portion 54 are coaxial with each other. Therefore, the valve body 18 has a stepped cylindrical shape as a whole.

Next, a nickel-plated steel plate having a thickness of 0.2 mm was punched and pressed to manufacture a positive electrode cap 20 having a cylindrical shape with a flange. Specifically, as shown in FIG. 2, the positive electrode cap 20 has a cylindrical body portion 40, an annular flange 42 provided at the peripheral edge of an opening 45 of a base end 41 of the body portion 40, and a top wall 44 provided so as to block a tip portion 43 on the opposite side to the base end 41. A gas vent hole 46 that opens sideway is formed in the lower portion of the body portion 40. The radius of the flange 42 was set to 4.9 mm.

Further, a nickel-plated steel plate having a thickness of 0.2 mm was punched to manufacture a disk-shaped cover plate 14 having a central through-hole 16 in the center.

Next, the valve body 18 was accommodated inside the positive electrode cap 20, the positive electrode cap 20 was placed on an outer surface 14*b* of the cover plate 14, and the portion of the flange 42 and the outer surface 14*b* of the cover plate 14 were welded to each other. At this time, the valve body 18 was arranged at a position where it blocked the central through-hole 16 of the cover plate 14. In this way, a sealing body 11 was manufactured.

(2) Assembly of AA-Size Cylindrical Nickel Hydrogen Secondary Battery

A positive electrode 24 and a negative electrode 26 for used in a general AA-size nickel hydrogen secondary battery were prepared. A separator 28 formed of a polypropylene fiber non-woven fabric was interposed between the positive electrode 24 and the negative electrode 26 to form a laminate of the positive electrode 24 and the negative electrode 26. This laminate was spirally wound to manufacture an electrode group 22.

Here, the other end portion of a positive electrode lead 30 formed of a thin plate made of nickel-plated steel was welded to the positive electrode 24 in advance. The positive electrode lead 30 was arranged at a position where it protruded from one end of the electrode group 22.

The obtained electrode group 22 was accommodated in an outer package can 10 having a bottomed cylindrical shape for AA size together with an alkaline electrolyte including a sodium hydroxide aqueous solution.

Next, the inner surface 14a of the cover plate 14 of the sealing body 11 and one end portion 38 of the positive electrode lead 30 were overlapped with and welded to each other. As a result, the positive electrode 24 and the positive electrode terminal (positive electrode cap 20) were electrically connected to each other via the cover plate 14 and the positive electrode lead 30.

Thereafter, sealant was coated on a range of the inner surface 14a of the cover plate 14, the range excluding a surface out of the inner surface 14a at which the cover plate 14 and the one end portion 38 of the positive electrode lead 30 were in contact with each other, and sealant was coated on a range of the entire surface of the positive electrode lead, the range excluding a surface out of the entire surface of the positive electrode lead at which the one end portion 38 of the positive electrode lead 30 and the cover plate 14 were in contact with each other, and also a surface out of the entire surface of the positive electrode lead at which the positive electrode lead 30 and the positive electrode 24 were in contact with each other, thereby forming an oxygen block layer 60. In other words, the oxygen block layer 60 was formed over almost the entire surface of the positive electrode lead 30 including the range covering a welded portion W in which the cover plate 14 and the one end portion 38 of the positive electrode lead 30 were overlapped with each other, and also almost the entire inner surface 14a of the cover plate 14. Here, a material which was obtained in the form of paste by dissolving blown asphalt in toluene was used as the sealant.

At this time, the sealant was coated by a brush so that the thickness of the oxygen block layer 60 was equal to 5 μm. After the sealant was coated, dry processing was conducted to obtain the oxygen block layer 60. Thereafter, the appearance of the oxygen block layer 60 was observed. As a result, no unevenness was observed. The presence or absence of unevenness is described in the column of "presence or absence of coating unevenness" in Table 1.

Thereafter, the sealing body 11 was fixed, by caulking, to the upper end opening of the outer package can 10 via an insulating packing 12. In this way, the AA-size battery 2 was manufactured. Note that the rated capacity of the manufactured battery 2 is 2300 mAh. The dimension of the manufactured battery 2 is 50 mm in height and 14 mm in diameter.

The above procedure was repeated to manufacture three batteries 2.

(3) Initial Activation Processing

A charging/discharging work of charging the obtained battery 2 with a current of 0.1 C for 16 hours under an environment of a temperature of 25° C. and then discharging the battery 2 with a current of 0.2 C until the battery voltage reached 0.5 V was repeated twice to perform initial activation processing. In this way, the battery 2 was set to be ready for use.

Example 2

A nickel hydrogen secondary battery under a usable state was manufactured in the same manner as that in Example 1 except that the sealant was coated only on a range of the entire surface of the positive electrode lead 30, the range excluding a surface out of the entire surface of the positive electrode lead 30 at which the one end portion 38 of the positive electrode lead 30 and the cover plate 14 were in contact with each other, and a surface out of the entire surface of the positive electrode lead 30 at which the positive electrode lead 30 and the positive electrode 24 were in contact with each other, thereby forming the oxygen block layer 60, and also the sealant was coated so that the thickness of the oxygen block layer 60 was equal to 5 μm. In other words, in Example 2, the oxygen block layer 60 is formed only on a surface out of the entire surface of the positive electrode lead 30, which is not in contact with other members.

Note that an observation result of unevenness of the oxygen block layer 60 was that no unevenness was observed.

Example 3

A nickel hydrogen secondary battery under a usable state was manufactured in the same manner as that in Example 1 except that the sealant was coated only on a range covering the welded portion W at which the cover plate 14 and the one end portion 38 of the positive electrode lead 30 were overlapped with each other, thereby forming the oxygen block layer 60, and the sealant was coated so that the thickness of the oxygen block layer 60 was equal to 5 μm.

Note that an observation result of unevenness of the oxygen block layer 60 was that no unevenness was observed.

Example 4

A nickel hydrogen secondary battery under a usable state was manufactured in the same manner as that in Example 1 except that the sealant was coated so that the thickness of the oxygen block layer 60 was equal to 9 μm. Note that an observation result of unevenness of the oxygen block layer 60 was that no unevenness was observed.

Example 5

A nickel hydrogen secondary battery under a usable state was manufactured in the same manner as that in Example 1 except that the sealant was coated only on a range of the entire surface of the positive electrode lead 30, the range excluding a surface out of the entire surface of the positive electrode lead 30 at which the one end portion 38 of the positive electrode lead 30 and the cover plate 14 were in contact with each other, and a surface out of the entire surface of the positive electrode lead 30 at which the positive electrode lead 30 and the positive electrode 24 were in contact with each other, thereby forming the oxygen block layer 60, and also the sealant was coated so that the thickness of the oxygen block layer 60 was equal to 9 μm. In other words, in Example 5, the oxygen block layer 60 is formed only on the surface out of the entire surface of the positive electrode lead 30, which is not in contact with other members.

Note that an observation result of unevenness of the oxygen block layer 60 was that no unevenness was observed.

Example 6

A nickel hydrogen secondary battery under a usable state was manufactured in the same manner as that in Example 1 except that the sealant was coated only on a range covering the welded portion W at which the cover plate 14 and the one end portion 38 of the positive electrode lead 30 were overlapped with each other, thereby forming the oxygen block layer 60, and also the sealant was coated so that the thickness of the oxygen block layer 60 was equal to 9 μm.

Note that an observation result of unevenness of the oxygen block layer 60 was that no unevenness was observed.

Example 7

A nickel hydrogen secondary battery under a usable state was manufactured in the same manner as that in Example 1 except that the sealant was coated so that the thickness of the oxygen block layer 60 was equal to 16 μm. Note that an observation result of unevenness of the oxygen block layer 60 was that no unevenness was observed.

Example 8

A nickel hydrogen secondary battery under a usable state was manufactured in the same manner as that in Example 1 except that the sealant was coated only on a range of the entire surface of the positive electrode lead 30, the range excluding a surface out of the entire surface of the positive electrode lead 30 at which the one end portion 38 of the positive electrode lead 30 and the cover plate 14 were in contact with each other, and a surface out of the entire surface of the positive electrode lead 30 at which the positive electrode lead 30 and the positive electrode 24 were in contact with each other, thereby forming the oxygen block layer 60, and also the sealant was coated so that the thickness of the oxygen block layer 60 was equal to 16 μm. In other words, in Example 8, the oxygen block layer 60 is formed only on the surface out of the entire surface of the positive electrode lead 30, which is not in contact with other members.

Note that an observation result of unevenness of the oxygen block layer 60 was that no unevenness was observed.

Example 9

A nickel hydrogen secondary battery under a usable state was manufactured in the same manner as that in Example 1 except that the sealant was coated only on a range covering the welded portion W at which the cover plate 14 and the one end portion 38 of the positive electrode lead 30 were overlapped with each other, thereby forming the oxygen block layer 60, and also the sealant was coated so that the thickness of the oxygen block layer 60 was equal to 16 μm.

Note that an observation result of unevenness of the oxygen block layer 60 was that no unevenness was observed.

Example 10

A nickel hydrogen secondary battery under a usable state was manufactured in the same manner as that in Example 1 except that the sealant was coated so that the thickness of the oxygen block layer 60 was equal to 80 μm. Note that an observation result of unevenness of the oxygen block layer 60 was that no unevenness was observed.

Example 11

A nickel hydrogen secondary battery under a usable state was manufactured in the same manner as that in Example 1 except that the sealant was coated only on a range of the entire surface of the positive electrode lead 30, the range excluding a surface out of the entire surface of the positive electrode lead 30 at which the one end portion 38 of the positive electrode lead 30 and the cover plate 14 were in contact with each other, and a surface out of the entire surface of the positive electrode lead 30 at which the positive electrode lead 30 and the positive electrode 24 were in contact with each other, thereby forming the oxygen block layer 60, and also the sealant was coated so that the thickness of the oxygen block layer 60 was equal to 80 μm. In other words, in Example 11, the oxygen block layer 60 is formed only on the surface out of the entire surface of the positive electrode lead 30, which is not in contact with other members.

Note that an observation result of unevenness of the oxygen block layer 60 was that no unevenness was observed.

Example 12

A nickel hydrogen secondary battery under a usable state was manufactured in the same manner as that in Example 1 except that the sealant was coated only on a range covering the welded portion W at which the cover plate 14 and the one end portion 38 of the positive electrode lead 30 were overlapped with each other, thereby forming the oxygen block layer 60, and also the sealant was coated so that the thickness of the oxygen block layer 60 was equal to 80 μm.

Note that an observation result of unevenness of the oxygen block layer 60 was that no unevenness was observed.

Example 13

A nickel hydrogen secondary battery under a usable state was manufactured in the same manner as that in Example 1 except that the sealant was coated by using a roller so that the thickness of the oxygen block layer 60 was equal to 3 μm. Note that an observation result of unevenness of the oxygen block layer 60 was that no unevenness was observed.

Comparative Example 1

A nickel hydrogen secondary battery under a usable state was manufactured in the same manner as that in Example 1 except that no sealant was coated on the cover plate 14 and the positive electrode lead 30 and thus the oxygen block layer 60 was not formed.

Comparative Example 2

A nickel hydrogen secondary battery under a usable state was manufactured in the same manner as that in Example 1 except that the sealant was coated so that the thickness of the oxygen block layer 60 was equal to 3 μm. Note that an observation result of unevenness of the oxygen block layer 60 was that unevenness was observed.

2. Evaluation of Nickel Hydrogen Secondary Battery

Continuous Charging Test

For the batteries of Examples 1 to 13 and Comparative Examples 1 and 2, continuous charging was conducted while a charging current of 0.1 C was made to flow in an environment of 70° C. The discharge capacities of the batteries were measured every month during the continuous charging. Further, it was assumed that the battery had reached its life at the time point when the measured discharge capacity fell below 60% of the initial discharge capacity, and the continuous charging was terminated at that time point. Thereafter, the battery was cooled to room temperature of 25° C.

(2) Destructive Inspection of Battery

Next, the battery for which the continuous charging test was completed was disassembled, and the assembly of the cover plate 14 and the positive electrode lead 30 was taken out from the inside. Then, the state of rust generation was visually observed for such an assembly. The presence or absence of rust was checked, the number of rusted batteries out of the three manufactured batteries was counted, and if at least one rusted battery existed, "presence" was marked, whereas if no rusted battery existed, "absence" was marked. The result is shown in Table 1. With respect to Examples 1 to 13 and Comparative Example 2 each having the oxygen block layer 60, the state after the oxygen block layer 60 was peeled off was observed.

Further, with respect to the inner surface 14a of the cover plate 14 and the entire surface of the positive electrode lead 30, the percentage of the surface area of rusted surfaces to the total surface area of surfaces which were not in contact with other members was calculated. The result is shown as an incidence of rust in Table 1. When the incidence of rust is 100%, it indicates that rust is generated on the entire inner surface 14a of the cover plate 14 and the entire surface of the positive electrode lead 30. As the value of the incidence of rust is lower, rust generation is less, and when the incidence of rust is equal to 0%, it indicates that no rust is generated.

battery fell into an overcharged state due to the continuous charging to generate oxygen gas, and a metal portion was corroded by the oxygen gas to generate rust.

Further, rust was also generated in the battery of Comparative Example 2 in which the sealant was coated to form the oxygen block layer 60 having a thickness of 3 μm, and the rust spread over the inner surface 14a of the cover plate 14 and the entire positive electrode lead 30. In Comparative Example 2, unevenness occurred in the oxygen block layer 60, and an extremely thin portion was formed. The thickness of this thin portion is considered to be less than 3 μm. It can be seen from this that even in the case where the oxygen block layer 60 is coated so that the thickness of the oxygen block layer 60 is equal to 3 μm, if an extremely thin portion of less than 3 μm is generated due to uneven coating of the sealant, it would be impossible to suppress corrosion of the metal portion due to oxygen gas and rust is generated. Therefore, it can be seen that the thickness of the thinnest portion of the oxygen block layer 60 should be set to 3 μm or more.

On the other hand, in the batteries of Examples 1 to 12 in which the sealant was coated to form the oxygen block layer 60 having a thickness of 5 μm to 80 μm, the incidence of rust is suppressed to 80% or less, and it can be seen that generation of rust could be suppressed as compared with Comparative Examples 1 and 2.

Further, when comparing a first pattern in which the portion at which the oxygen block layer 60 is formed is the welded portion between the positive electrode lead and the cover plate, a second pattern in which the portion is only the

TABLE 1

| | | | PORTION WHERE OXYGEN BLOCK LAYER IS FORMED | | | | |
|---|---|---|---|---|---|---|---|
| | THICKNESS OF OXYGEN BLOCK LAYER [μm] | PRESENCE OR ABSENCE OF COATING UNEVENNESS | WELDED PORTION BETWEEN POSITIVE ELECTRODE LEAD AND COVER PLATE | ONLY POSITIVE ELECTRODE LEAD | ENTIRE POSITIVE ELECTRODE LEAD AND INNER SURFACE OF COVER PLATE | OBSERVATION RESULT OF RUST | |
| | | | | | | GENERATION OR NON-GENERATION OF RUST | INCIDENCE OF RUST [%] |
| COMPARATIVE EXAMPLE 1 | 0 | — | — | — | — | GENERATED | 100 |
| COMPARATIVE EXAMPLE 2 | 3 | PRESENCE | | | ○ | GENERATED | 100 |
| EXAMPLE 1 | 5 | ABSENCE | | | ○ | GENERATED | 50 |
| EXAMPLE 2 | 5 | ABSENCE | | ○ | | GENERATED | 70 |
| EXAMPLE 3 | 5 | ABSENCE | ○ | | | GENERATED | 80 |
| EXAMPLE 4 | 9 | ABSENCE | | | ○ | NON-GENERATED | 0 |
| EXAMPLE 5 | 9 | ABSENCE | | ○ | | GENERATED | 30 |
| EXAMPLE 6 | 9 | ABSENCE | ○ | | | GENERATED | 40 |
| EXAMPLE 7 | 16 | ABSENCE | | | ○ | NON-GENERATED | 0 |
| EXAMPLE 8 | 16 | ABSENCE | | ○ | | GENERATED | 10 |
| EXAMPLE 9 | 16 | ABSENCE | ○ | | | GENERATED | 20 |
| EXAMPLE 10 | 80 | ABSENCE | | | ○ | NON-GENERATED | 0 |
| EXAMPLE 11 | 80 | ABSENCE | | ○ | | GENERATED | 10 |
| EXAMPLE 12 | 80 | ABSENCE | ○ | | | GENERATED | 20 |
| EXAMPLE 13 | 3 | ABSENCE | | | ○ | GENERATED | 80 |

3. Consideration

From Table 1, in the battery of Comparative Example 1 in which no sealant was coated and thus no oxygen block layer was formed, rust was generated, and the rust spread over the inner surface 14a of the cover plate 14 and the entire positive electrode lead 30. It is considered that this was because the positive electrode lead, and a third pattern in which the portion is the entire positive electrode lead and the inner surface of the cover plate, the incidence of rust is highest in the first pattern, medium in the second pattern, and lowest in the third pattern. From this, the third pattern can suppress the generation of rust most greatly, and therefore it is preferable that the portion at which the oxygen block layer 60 is formed is set to the third pattern.

Here, in the third pattern in which the portion at which the oxygen block layer 60 is formed is the entire positive electrode lead and the inner surface of the cover plate, the incidence of rust was equal to 50% in Example 1 in which the thickness of the oxygen block layer 60 was set to 5 µm. On the other hand, in all of Example 4 in which the thickness of the oxygen block layer 60 was set to 9 µm, Example 7 in which the thickness of the oxygen block layer 60 was set to 16 µm, and Example 10 in which the thickness of the oxygen block layer 60 was set to 80 µm, the incidence of rust was equal to 0%, no rust was generated, and the inner surface 14a of the cover plate 14 and the positive electrode lead 30 maintained metallic luster, and were almost in an initial state. It is considered that this was because even when the battery fell into an overcharged state due to continuous charging and oxygen gas was generated, the inner surface 14a of the cover plate 14 and the positive electrode lead 30 were reliably protected by the oxygen block layer 60 and were not corroded by the oxygen gas. As described above, since the inner surface 14a of the cover plate and the positive electrode lead 30 can maintain their initial states, it is apparent that increase in the internal resistance value and liquid leakage caused by corrosion can be avoided. From this, it is more preferable to adopt the third pattern in which the portion at which the oxygen block layer 60 is formed is the entire positive electrode lead and the inner surface of the cover plate, and set the thickness of the oxygen block layer 60 to 9 µm or more.

Further, when the oxygen block layer 60 is uniformly formed at a thickness of 3 µm without unevenness as in the case of Example 13, it can be said that the generation of rust is suppressed as compared with Comparative Example 2 having unevenness. It can be said from this that the thickness of the thinnest portion of the oxygen block layer 60 should be set to 3 µm or more.

From the foregoing, the nickel hydrogen secondary battery according to the present disclosure is not easily affected by oxygen gas even in a situation where it is likely to be overcharged as in the case of the continuous charging, and it is possible to suppress generation of rust. Therefore, according to the present disclosure, it is possible to supply a high-quality battery that is capable of suppressing defects caused by generation of rust, for example, suppressing an increase in internal resistance value and leakage of an alkaline electrolyte.

The present disclosure is not limited to the above-described embodiments and examples, and various modifications can be made. For example, the type of the battery is not limited to the nickel hydrogen secondary battery, and it may be a nickel-cadmium secondary battery or the like. Further, the shape of the battery is not limited to the cylindrical shape, and it may be a square shape.

Aspects of the Present Disclosure

A first aspect of the present disclosure is an alkaline secondary battery comprises: an electrode group including a positive electrode and a negative electrode that face each other via a separator; an outer package can that has an opening at an upper end thereof and accommodates the electrode group therein together with an electrolyte; a sealing body including a cover plate fitted in the opening of the outer package can, and a positive electrode terminal which is electrically connected to an outer surface of the cover plate located outside the outer package can; a positive electrode lead, one end portion of which is electrically connected to an inner surface of the cover plate located inside the outer package can, and the other end portion of which is electrically connected to the positive electrode; and a coating layer that covers at least a range where the one end portion of the positive electrode lead and the inner surface of the cover plate overlap each other, and suppresses permeation of oxygen therethrough, wherein a thickness of a thinnest portion of the coating layer is 3 µm or more.

According to the first aspect of the present disclosure, even if oxygen gas is generated in the battery due to continuous charging, the cover plate and the positive electrode lead are protected by the coating layer, and oxidation by the oxygen gas is suppressed, so that it is possible to prevent defects caused by generation of rust.

A second aspect of the present disclosure is an alkaline secondary battery in which the coating layer covers a range of an entire surface of the positive electrode lead, the range excluding a surface out of the entire surface of the positive electrode lead at which the positive electrode lead is in contact with other members in the first aspect of the present disclosure described above.

According to the second aspect of the present disclosure, a portion out of the surface of the positive electrode lead which may be exposed to oxygen gas is entirely covered with the coating layer, so that the generation of rust can be suppressed more reliably. For example, even when a pinhole is generated in a nickel plating of the positive electrode lead, the generation of rust can be suppressed.

A third aspect of the present disclosure is an alkaline secondary battery in which the coating layer covers a range of the inner surface of the cover plate, the range excluding a surface out of the inner surface of the cover plate at which the cover plate is in contact with other members, and a range of the entire surface of the positive electrode lead, the range excluding a surface out of the entire surface of the positive electrode lead at which the positive electrode lead is in contact with other members in the first aspect of the present disclosure.

According to the third aspect of the present disclosure, portions out of the surfaces of the cover plate and the positive electrode lead that may be exposed to oxygen gas are entirely covered with the coating layer, so that the generation of rust can be suppressed more reliably. For example, even when a pinhole is generated in the nickel plating of the cover plate or the positive electrode lead, the generation of rust can be suppressed.

A fourth aspect of the present disclosure is an alkaline secondary battery in which the coating layer contains blown asphalt in any one of the first to third aspects of the present disclosure described above.

According to the fourth aspect of the present disclosure, since blown asphalt is difficult to permeate oxygen therethrough and has alkali resistance, so that generation of rust in the cover plate and the positive electrode lead can be stably prevented in the alkaline secondary battery.

EXPLANATION OF REFERENCE SIGNS

2 Nickel hydrogen secondary battery
10 outer package can
12 insulating packing
11 sealing body
14 cover plate
18 valve body
20 positive electrode cap (positive electrode terminal)

24 positive electrode
26 negative electrode
28 separator
42 flange
60 oxygen block layer (coating layer)

The invention claimed is:

1. An alkaline secondary battery comprising:

an electrode group including a positive electrode and a negative electrode that face each other via a separator;

an outer package can that has an opening at an upper end thereof and accommodates the electrode group therein together with an electrolyte;

a sealing body including a metal disk-shaped cover plate fitted in the opening of the outer package can, and a positive electrode terminal which is electrically connected to an outer surface of the cover plate located outside the outer package can;

a positive electrode lead, a first end portion of which is in direct contact with and electrically connected to an inner surface of the cover plate located inside the outer package can, and a second end portion of which is electrically connected to the positive electrode, wherein the positive electrode lead is welded to the cover plate at a welded portion; and a coating layer provided on the welded portion and the positive electrode lead that covers a first range of the inner surface of the cover plate, the first range excluding a surface out of the inner surface of the cover plate at which the cover plate is in contact with the positive electrode lead, and a second range of an entire surface of the positive electrode lead, the second range excluding a surface out of the entire surface of the positive electrode lead at which the positive electrode lead is in contact with the inner surface of the cover plate or with the positive electrode, and suppresses permeation of oxygen therethrough, wherein a thickness of the coating layer is 9 μm or more, and no rust is generated on the inner surface of the cover plate or the positive electrode lead.

2. The alkaline secondary battery according to claim 1, wherein the thickness of the coating layer is 16 μm or more.

3. The alkaline secondary battery according to claim 1, wherein the thickness of the coating layer is more than 20 μm and less than or equal to 80 μm.

4. The alkaline secondary battery according to claim 1, wherein the coating layer contains blown asphalt.

5. The alkaline secondary battery according to claim 1, wherein the metal disk-shaped cover plate includes a central through-hole, and the coating layer is provided on an inner peripheral surface of the central through-hole.

6. The alkaline secondary battery according to claim 1, wherein the coating layer comprises a rubber-based material.

7. The alkaline secondary battery according to claim 6, wherein the rubber-based material comprises ethylene propylene diene rubber.

* * * * *